(12) United States Patent
Flaherty (10) Patent No.: US 7,870,855 B2
(45) Date of Patent: Jan. 18, 2011

(54) SOLAR HEAT COLLECTING APPARATUS

(76) Inventor: B. Michael Flaherty, 1968 NW. Palmetto Ter., Stuart, FL (US) 34994

( * ) Notice: Subject to any disclaimer, the term of this patent is extended or adjusted under 35 U.S.C. 154(b) by 318 days.

(21) Appl. No.: 12/009,092

(22) Filed: Jan. 16, 2008

(65) Prior Publication Data

US 2009/0178348 A1 Jul. 16, 2009

(51) Int. Cl.
F24J 2/24 (2006.01)
F24J 2/44 (2006.01)
(52) U.S. Cl. ...................... 126/651; 126/638
(58) Field of Classification Search ........... 126/651, 126/638; 60/641.8; 136/248
See application file for complete search history.

(56) References Cited

U.S. PATENT DOCUMENTS

| | | | | |
|---|---|---|---|---|
| 1,747,826 | A * | 2/1930 | Gould | 126/651 |
| 2,552,237 | A * | 5/1951 | Trombe | 126/651 |
| 3,853,114 | A * | 12/1974 | Gaydos, Jr. | 126/653 |
| 4,044,753 | A * | 8/1977 | Fletcher et al. | 126/600 |
| 4,057,048 | A | 11/1977 | Maine | |
| 4,136,670 | A | 1/1979 | Davis | |
| 4,153,104 | A * | 5/1979 | Ruder | 165/48.2 |
| 4,154,657 | A * | 5/1979 | Dennen | 202/234 |
| 4,172,442 | A * | 10/1979 | Boblitz | 126/591 |
| 4,211,213 | A * | 7/1980 | Nissen et al. | 126/563 |
| 4,249,520 | A * | 2/1981 | Orillion | 126/651 |
| 4,267,826 | A * | 5/1981 | Hitt, Jr. | 126/647 |
| 4,305,383 | A | 12/1981 | Bloxsum | |
| 4,314,397 | A * | 2/1982 | Goolsby et al. | 29/890.033 |
| 4,341,204 | A * | 7/1982 | Bloxsom | 126/651 |
| 4,404,961 | A * | 9/1983 | Stuhlman | 126/647 |
| 4,429,545 | A * | 2/1984 | Steinberg | 62/235.1 |
| 5,004,374 | A * | 4/1991 | Grey | 405/154.1 |
| 5,427,628 | A | 6/1995 | Hartley | |
| 2002/0117166 | A1* | 8/2002 | Okumura | 126/633 |
| 2007/0186922 | A1* | 8/2007 | Guenter | 126/651 |

FOREIGN PATENT DOCUMENTS

JP 2002-286299 * 10/2002
WO WO 2005003643 A1 * 1/2005

* cited by examiner

*Primary Examiner*—Henry Yuen
*Assistant Examiner*—Frances Kamps
(74) *Attorney, Agent, or Firm*—Norman Friedland (57) ABSTRACT

A solar heat collecting dome includes a frame having an odd number of frame elements extending upward and inward from a floor structure to a disk at the top of the dome. A dome shaped helical structure including two flexible tubes is woven to extend along and around the frame elements, with the dome shaped helical structure extending across alternating inner and outer sides of the frame elements, and with adjacent portions of the dome shaped helical structure extending across alternating inner and outer sides of each frame element. At an outer end of the dome shaped helical structure, the two tubes form an inlet and an outlet. At the inner end, the two tubes are joined. The frame may also include a fluid path, with the fluid moving in opposite directions in each of the frame elements.

9 Claims, 11 Drawing Sheets

SOLAR HEAT COLLECTING APPARATUS

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to solar heat collecting apparatus, and, more particularly to such apparatus including one or more paths through which a fluid is circulated to provide heat at one or more locations external to the apparatus.

2. Summary of the Background Information

A number of patents show hemispherical domes including lenses for concentrating solar energy on fluids within the domes. For example, U.S. Pat. No. 4,305,383 shows a solar energy collector with an energy concentrating unit having at least one converging lens for concentrating the sun's rays onto a collecting unit, which includes a fluid-transporting member in which a heat transferring fluid is circulated. U.S. Pat. No. 4,057,048 shows a dome formed of interconnected lenses focusing solar radiation on a shallow tray of water. U.S. Pat. No. 4,136,670 describes a dome carrying a double convex lens array and an internal reflector dish with a liquid flowing through the dish. U.S. Pat. No. 5,427,628 shows a spherical dome structure including two-way mirrors and an external convex lens to direct and concentrate solar energy inside the dome.

U.S. Pat. No. 4,429,545 describes a solar heating system including a flat plate solar collector having a heat absorber woven, basket-fashion, across a riser grid system including a suitable flow medium for being heated by solar energy.

SUMMARY OF THE INVENTION

In accordance with one aspect of the invention, solar heat collecting apparatus is provided, including a frame having a plurality of frame elements and a first plurality of transverse elements, which extend across each of the frame elements and interwoven with the frame elements so that each transverse element extends across the frame elements alternately inside and outside the frame elements, and so that transverse elements adjacent one another cross each frame element on opposite sides of the frame element, wherein each of the transverse elements includes a portion of a first fluid path.

Preferably, each of the frame elements extends upward and inward from a lower end attached to a floor structure to an upper end attached to an upper plate, with all of the frame elements comprising an odd number of frame elements arranged in a circular pattern and with each of the transverse elements extends completely around the circular pattern.

Preferably, each transverse element in the first plurality of transverse elements additionally includes a second fluid path, with fluid flowing in opposite directions within the first and second fluid paths, with the transverse elements being connected to one another to form a dome shaped helical structure extending around and along the frame elements. Such a dome shaped helical structure includes a first end, having an inlet connected to the first fluid path and an outlet connected to the second fluid path, and a second end, in which the first fluid path is connected to the second fluid path. For example, the first and second fluid paths may be connected to a first heat receiving structure by first fluid lines, with a first fluid being circulated through the first and second fluid paths, the first fluid lines, and the first heat receiving structure.

The dome shaped helical structure is wound onto the frame with the frame being held in an inverted position. When adjacent frame elements are connected at their lower ends by peripheral frame sections, gaps are provided between adjacent peripheral sections, with these gaps being closed by connectors installed after the process of installing the dome shaped helical structure.

In one embodiment of the invention, space for a doorway is provided between an adjacent pair of the frame elements, which are formed as doorway frame elements. The solar heat collecting apparatus additionally includes a second plurality of transverse elements, which extend around each of the doorway frame elements and across the frame elements extending between the door elements in the circular pattern formed by the frame elements, alternately inside and outside these frame elements. Within these transverse elements adjacent frame elements also extend across opposite sides of each of the frame elements between the doorway frame elements. The transverse elements in the second priority of transverse frame elements are joined to one another to form a reversing spiral structure connected to the dome shaped helical structure, with a first fluid path within the reversing spiral structure being connected to the first fluid path within the helical spiral, and with a second fluid path within the reversing spiral structure being connected to the second fluid path within the helical spiral.

The frame may additionally include an inlet, an outlet, and a frame fluid path extending between the inlet and the outlet, with each of the frame elements including a pair of tubular sections forming portions of the frame fluid path, and with a second fluid flowing in opposite directions within the pair of tubular elements. For example, each end of the frame fluid path is connected to a second heat receiving structure by second fluid lines, with a second fluid being circulated through the frame fluid path, through the second fluid lines, and through the second heat receiving structure.

The solar heating includes an inner space surrounded by the frame and the transverse elements, and may additionally include an opening within the frame and transverse elements to allow solar radiation into this inner space. A lens may be used to concentrate solar radiation passing through this opening on a dish-shaped absorber located at the focal point of the lens.

Preferably, the frame and transverse elements are covered by a translucent cover. Ribs may be provided under this cover so that it is held away from the frame and transverse elements.

DETAILED DESCRIPTION OF THE INVENTION

Figure 1:
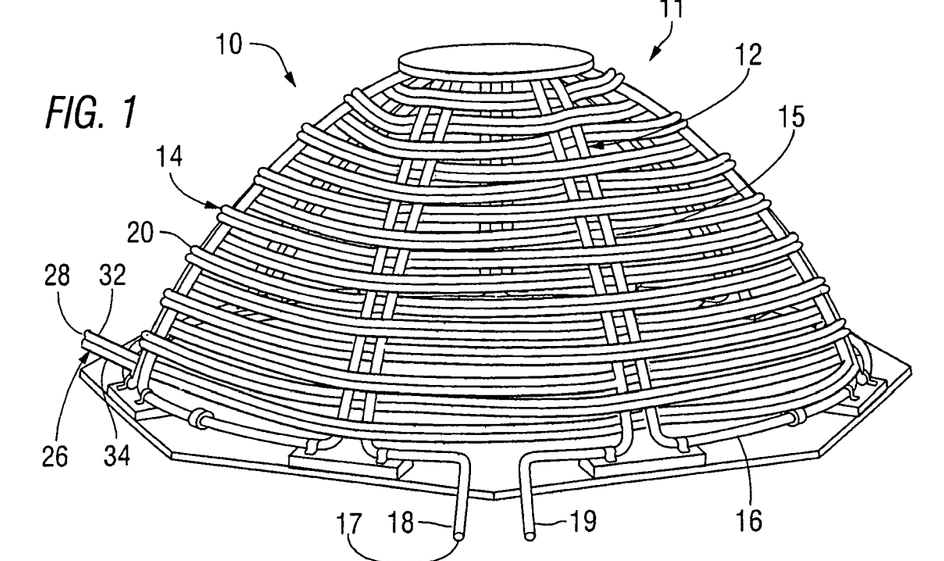
FIG. 1 is a perspective view of a solar heat collecting dome built in accordance with the invention.

FIG. 1 is a perspective view of a solar heat collecting dome 10 built in accordance with a first embodiment of the invention to include a frame 11, having a plurality of frame elements 12, and a plurality of transverse elements 14. Each of the frame elements 12 includes a pair of rigid tubular elements 15, extending parallel to one another. Preferably, the rigid tubular elements 15 and peripheral tubular elements 16 within the frame 11 are interconnected to form a frame fluid path 17 extending from an inlet end 18 to an outlet end 19. Each of the transverse elements 14 includes a pair of flexible tubular elements 20. For example, the rigid tubular elements 15, 16 are formed from sections of metal pipes, while the flexible tubular flexible tubular elements 20 are formed from a hose.

Figures 2, 4, 5:
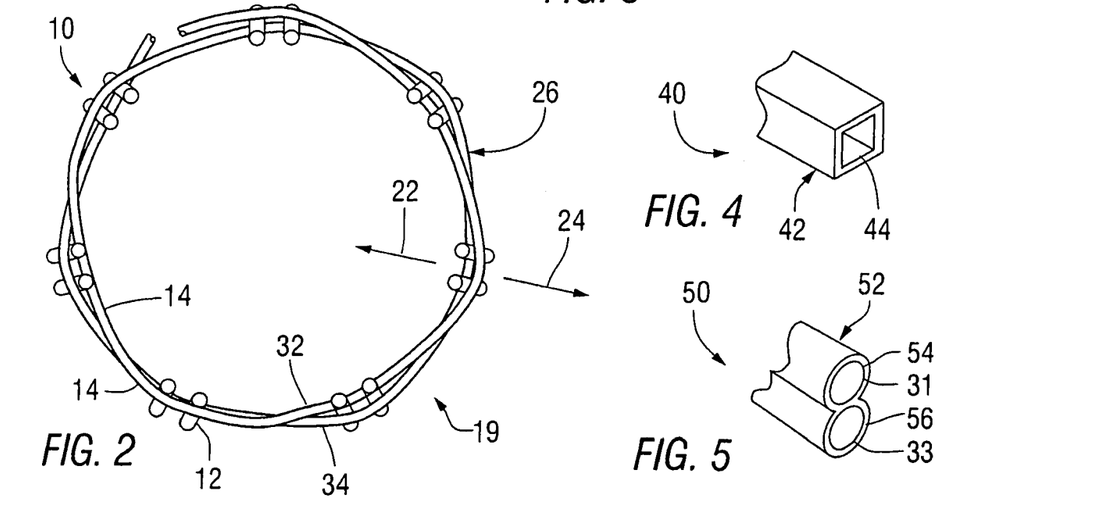
FIG. 2 is a fragmentary cross-sectional plan view of the solar heat collecting dome of FIG. 1.
FIG. 4 is a fragmentary perspective view of a first alternative version of a dome shaped helical structure for use within the solar heat collecting dome of FIG. 1.
FIG. 5 is a fragmentary perspective view of a second alternative version of a dome shaped helical structure for use within the solar heat collecting dome of FIG. 1.

FIG. 2 is a fragmentary cross-sectional plan view of the solar heat collecting dome 10, showing sections of the frame elements 12 therein and additionally showing an adjacent pair of transverse elements 14, each of which extends around a circular pattern 19 formed by the frame elements 12. The transverse elements 14 are interwoven with the frame elements 12 so that each transverse element 14 extends across the frame elements 12 alternately inside, in the direction of arrow 22, or outside, in the direction of arrow 24 adjacent frame elements 12. In addition, transverse elements 14 adjacent one another cross each frame element 12 on opposite sides of the frame element 12, i.e. inside the frame element 12, in the direction of arrow 22, or outside the frame element 12, in the direction of arrow 24. In a preferred embodiment of the invention, adjacent transverse elements 14 are connected to one another to form a single dome shaped helical structure 26 extending in a helical pattern around and along the frame elements 12, with all of the transverse elements 14 being sections of a single dome shaped helical structure 26. For these conditions to be met, the solar heat conducting dome 10 must have an odd number of frame elements 12, such as the seven frame elements 12 shown in the figures.

Figure 3:
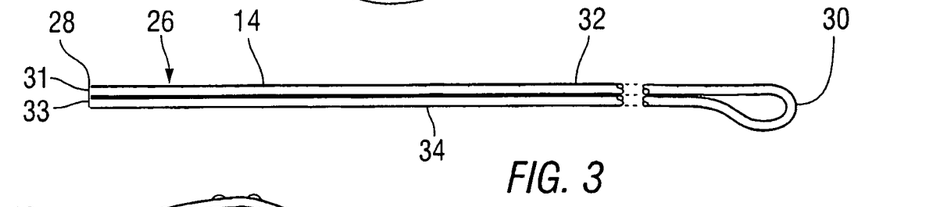
FIG. 3 is a dome shaped helical structure within the solar heat collecting dome of FIG. 1, shown in a straightened condition.

FIG. 3 is a fragmentary elevation of the single dome shaped helical structure 26, shown in a straightened condition. The single dome shaped helical structure 26 is formed from a single section of hose to include the plurality of transverse elements 14, with the dome shaped helical structure 26 extending between a first end 28 and a second end 30. At the first end 28 of the dome shaped helical structure 26, a first fluid path 31 formed within a first hose segment 32, is connected to a fluid source (not shown), and a second fluid path 33, formed within a second hose segment 34 is connected to a fluid receiver (not shown). At the second end 30 of the dome shaped helical structure 26, the hose segments 32, 34 are connected to one another. Thus, each of the transverse elements 14 includes a portion of the first hose segment 32 and a portion of the second hose segment 34, with fluid flowing in opposite directions within the hose segments 32, 34. As shown in FIG. 1, the first end 28 of the dome shaped helical structure 26 extends outward so that connections to the hose segments 32, 34 can be made.

Figure 6:
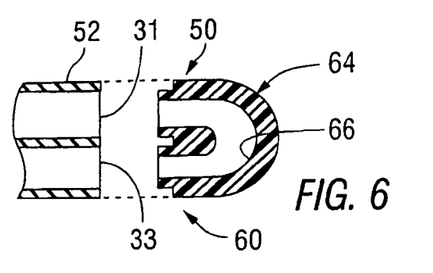
FIG. 6 is a fragmentary cross-sectional elevation of an end of the dome shaped helical structure of FIG. 5.
Figure 7:
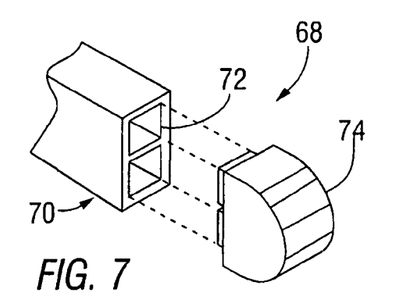
FIG. 7 is a fragmentary perspective view of a third alternative version of a dome shaped helical structure for use within the solar heat collecting dome of FIG. 1.

FIGS. 4-7 show alternate versions of a single dome shaped helical structure, configured for us as the dome shaped helical structure 26, described above with reference to FIGS. 1 and 2, with FIG. 4 being a fragmentary perspective view of a first alternative version 40 formed from a hose 42 having a square opening 44. FIG. 5 is a fragmentary view of a second alternative version 50 including an extrusion 52 having a first cylindrical opening 54 forming the first fluid path 31 and a second cylindrical opening 56 forming the second fluid path 33. FIG. 6 is a cross-sectional elevation of an end 60 of the second alternative version 50, showing the extrusion 52 in an exploded relationship with a path connector 64 having an opening 66 connecting the first fluid path 31 with the second fluid path 33. For example, the path connector 64 is attached to the extrusion 33 by a commercially available adhesive. FIG. 7 is a fragmentary perspective view of a third alternative version 68, in which an extrusion 70 having polygonally shaped openings, such as square channels 72, is shown in an exploded relationship with a mating path connector 74.

Figure 8:
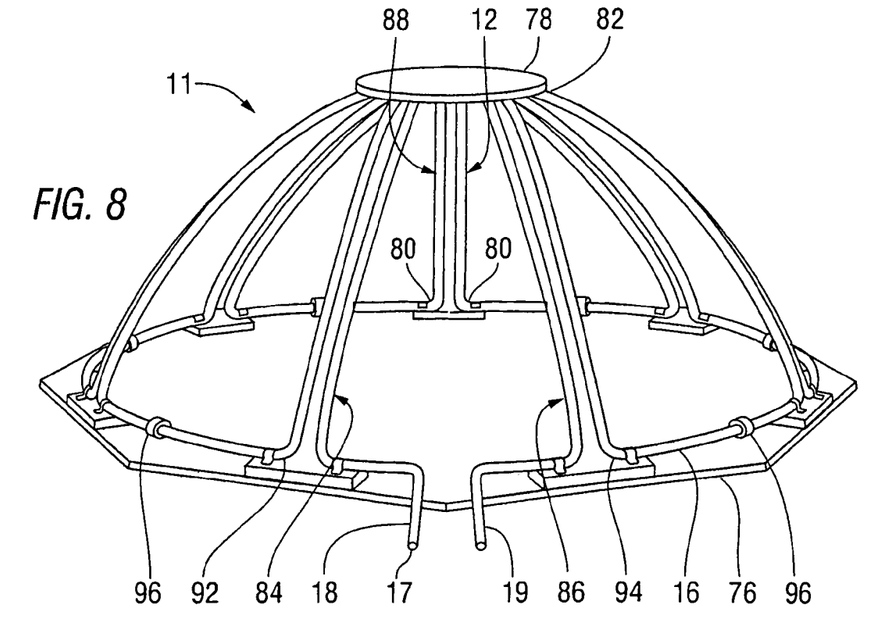
FIG. 8 is a perspective view of a first version of a frame within the solar heat collecting dome of FIG. 1.

FIG. 8 is a perspective view of the first version 11 of a frame within the solar heat collecting dome 10, including a floor structure 76, an upper disk 78 and a number of the frame elements 12, each extending upward and inward between a first end 80 of the frame element 12 at the floor structure 76 and a second end 82 of the frame element 12 at the upper disk 78. The frame fluid path 17 extends within the tubular structure of the frame 11, with the plurality of frame elements 12 including an inlet frame element 84, an outlet frame element 86, and a number of intermediate frame elements 88. The portion of the frame fluid path 17 within the inlet frame element 84 includes the inlet end 18 connected to fluid source (not shown) and a second end 92 connected to the portion of the frame fluid path 17 within an adjacent frame element 12. The portion of the frame fluid path 17 within the outlet frame element 86 includes the outlet end 19 extending outward to be connected to a fluid receiver (not shown) and a second end 94 connected to the portion of the frame fluid path 17 within an adjacent frame element 12. The frame fluid path 17 within each of the intermediate frame elements 88 is connected at each end 80 to a portion of the frame fluid path 17 within an adjacent frame element 12. At the first ends 80 of the frame elements 12, portions of the frame fluid path 12 are interconnected by peripheral tubular elements 16 and by removable connectors 96.

Figure 9:
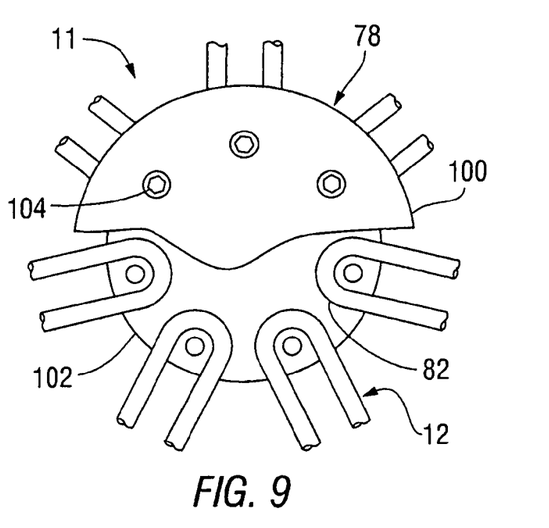
FIG. 9 is a fragmentary plan view of the frame of FIG. 8.

FIG. 9 is a fragmentary plan view of the first frame version 11, particularly showing the upper disk 78 and the second ends 82 of the frame elements 12. For example, the upper disk 78 includes an upper plate 100, a lower plate 102 and a number of screws 104 connecting the upper and lower plates 100, 102 so that the second ends 82 of the frame elements 12 are held between the plates 100, 102.

Figure 10:
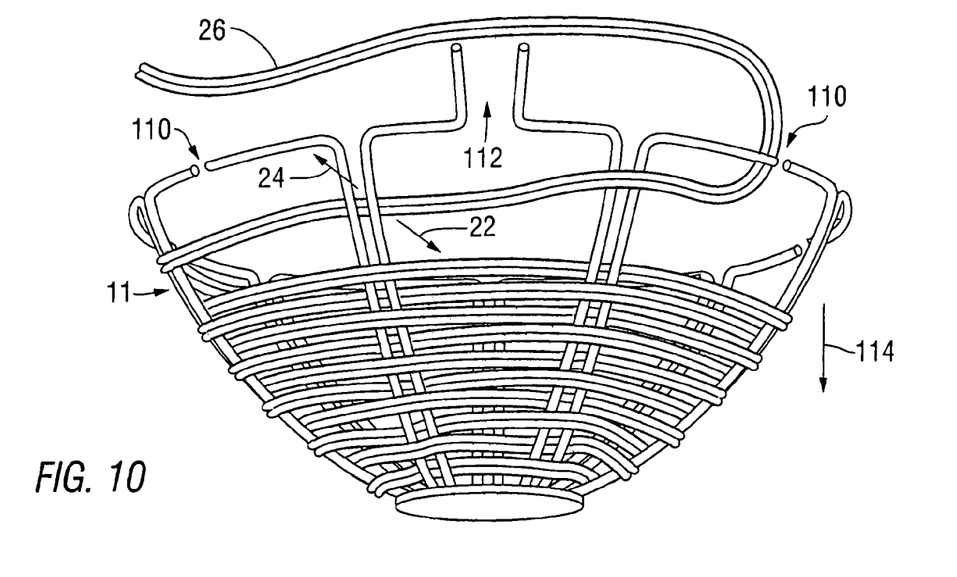
FIG. 10 is a perspective view of the frame of FIG. 8, showing the dome shaped helical structure of FIG. 3 being interwoven with frame elements within the frame.

FIG. 10 is a perspective view of the first frame version 11 showing the dome shaped helical structure 26 being interwoven with the frame elements 12. This process occurs with the first frame version 11 resting in an inverted orientation and with the connectors 96 (shown in FIG. 8) not installed within the first frame version 11, so that a gap 110 is present between the peripheral tubular elements 16 extending between adjacent frame elements 12. A gap 112 also extends between the inlet end 18 and the outlet end 19 of the first frame version 11. The dome shaped helical structure 26 is moved downward, in the direction of arrow 114, through each of the gaps 110, 112 to pass inward, in the direction of arrow 22, or outward, in the direction of arrow 24 from alternating frame elements 12.

Figure 11:
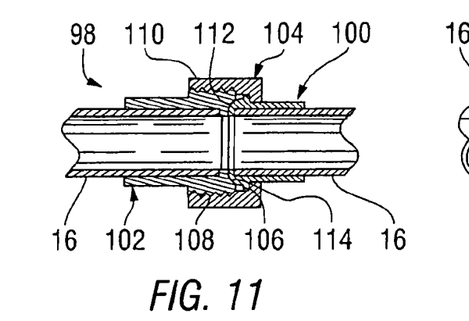
FIG. 11 is a longitudinal cross-sectional view of a connector within the frame of the frame of FIG. 8.

Exemplary forms of the connector 96 will now be discussed, with reference being made to FIGS. 11-13. FIG. 11 is a longitudinal cross-sectional view of a connector 98, which is a first exemplary form of the connector 96. The connector 98 includes a first pipe fitting 100, a second pipe fitting 102, and a coupling 104. The first and second pipe fittings 100, 102 are attached to the peripheral tubular elements 16, for example by brazing. The coupling 104 engages a flange 106 of the first pipe fitting 100 and a threaded surface 108 of the second pipe fitting 102. As a hexagonal surface 110 of the coupling 104 is turned to increase engagement with the threaded surface 108, a rounded end 112 of the first pipe fitting 100 is brought into contact with a conical end surface 114 of the second pipe fitting 102. The connector 96 may then be disengaged to separate the two peripheral tubular elements 16 can be separated from one another, and pulled apart, if necessary, to form a gap 110, as shown in FIG. 10.

Figure 12:
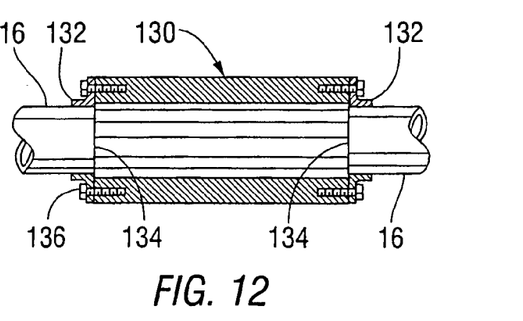
FIG. 12 is a longitudinal cross-sectional view of a first alternative connector for use within the frame of FIG. 8.

FIG. 12 is a longitudinal cross-sectional view of a first alternative connector 130, which can be used in place of the connector 96 described above, with flanges 132 being attached to the ends 134 of the peripheral tubular elements 16, for example by brazing. A number of screws 136, extending in a circular pattern from each of the flanges 132 are used to fasten the connector 130 in place between the flanges 132.

Figure 13:
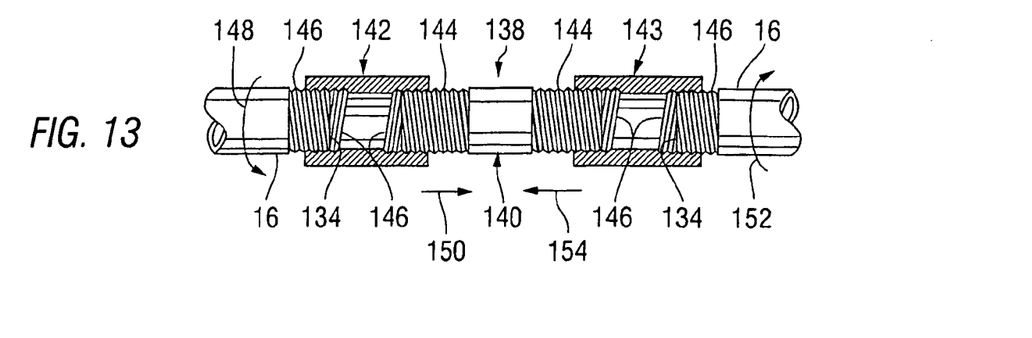
FIG. 13 is a longitudinal cross-sectional view of a second alternative connector for use within the frame of FIG. 8.

FIG. 13 is a longitudinal cross-sectional view of a second alternative connector 138 that can be used in place of the connector 96 described above. The connector 138 includes a central tubular section 140, which is preferably similar in diameter to the peripheral tubular elements 16, and a pair of outer sections 142, 143. All the threads within the connector 138 are similar, being, for example, right-hand threads. The central tubular section 140 includes external threads 144, which are similar to the external threads 146 of the peripheral tubular elements 16. Each of the outer sections 142 includes internal threads 146, engaging the external threads 144, 146. To remove the connector 138 from the peripheral tubular elements 16, the first outer section 142 is rotated in a direction indicated by the arrow 148 with the central tubular section 140 being held stationary, moving the first outer section 142 in the direction of arrow 150. Then, the second outer section 143 is rotated in the direction of arrow 152 with the central tubular section 140 being held stationary, moving the second outer section 143 in the direction of arrow 154. The connector 138 is then reinstalled between the peripheral tubular elements 16 by reversing this process.

While the connector 98 has an advantage of simplicity, the alternative connectors 130, 138 have an advantage of not requiring the ends 134 of the peripheral tubular elements 16 to be spread apart to remove or install the connector 130, 138. Each of the connectors 130, 138 may be made long enough to allow the passage of the helical element 26 between the ends 154 of the peripheral tubular elements 16.

Figure 14:
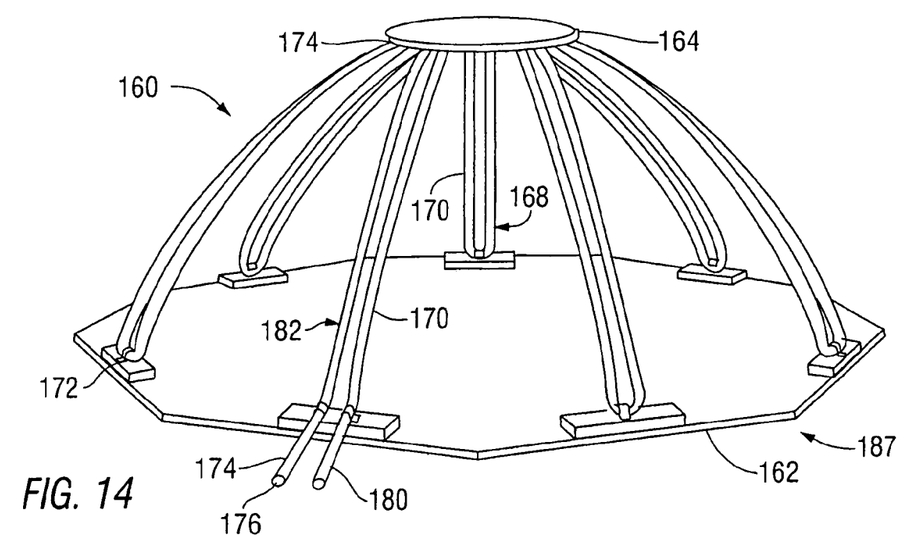
FIG. 14 is a perspective view of a second version of a frame for use within the solar heat collecting dome of FIG. 1.

FIG. 14 is a perspective view of a second version 160 of a frame for use within the solar heat collecting dome 10 in place of the first version 11 of the frame. The second frame version 160 includes a floor structure 162, an upper disk 164, and a number of frame elements 168, each including a pair of adjacent tubes 170, extending upward and inward between a lower end 172 at the floor structure 162 and an upper end 174 at the upper disk 164. A frame fluid path 176 extends within the tubular structure of the frame 160 between an inlet 178 and an outlet 180. The second frame version 160 includes an inlet/outlet frame element 182 in which one end of the frame fluid path 176 extends through the inlet 178, and in which the other end of the frame fluid path 176 extends through the outlet 180.

Figure 15:
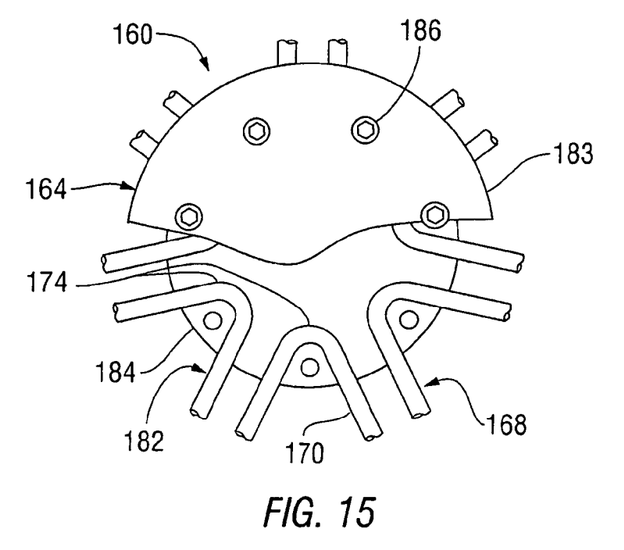
FIG. 15 is a fragmentary plan view of the frame version of FIG. 14.

FIG. 15 is a fragmentary plan view of the second frame version 160, showing the upper disk 164, which includes an upper plate 183 and a lower plate 184, held together by screws 186, with the upper ends 174 of the frame elements 168, 182 being held between the plates 183, 184. At the upper ends 174 of each of the frame elements 168, 182, the portion of the frame fluid path 176 within the frame element 168, 182 is connected with the portion of the frame fluid path 176 within the adjacent frame element 168, 182.

At the lower ends 172 of each of the frame elements 168, the portion of the frame fluid path 176 within the adjacent tubes 170 of the frame element are joined with one another. Since gaps 187 are present between adjacent frame elements 168, 172, a helical element 26 may be interwoven with the frame elements 168, 182, in the manner discussed above in reference to FIG. 10, without a need to employ a connector 98, 130, 138 as discussed above in reference to FIGS. 11-13.

Figure 16:
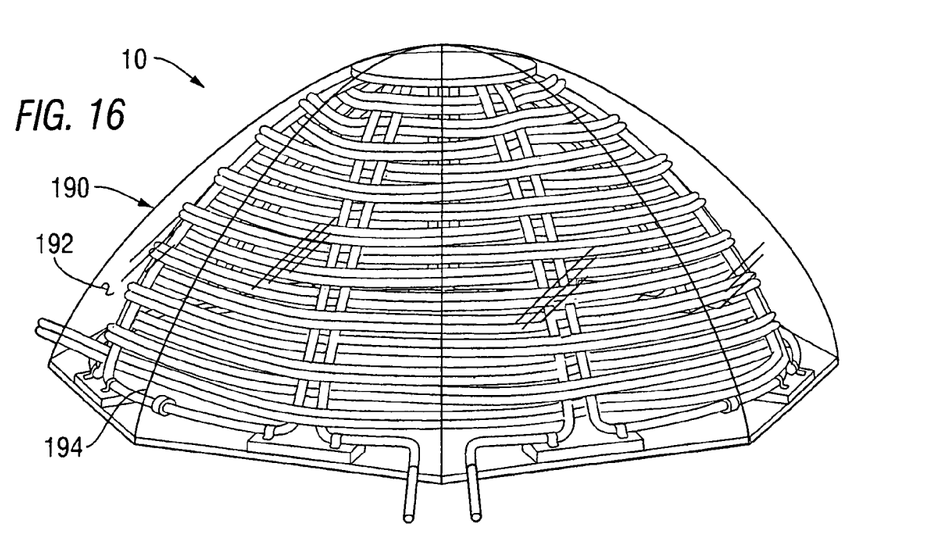
FIG. 16 is a perspective view of the solar heat collecting dome of FIG. 1 including a translucent cover.

FIG. 16 is a perspective view of the solar heat collecting dome 10 built in accordance with a preferred version of the first embodiment of the invention to include a translucent cover 190, extending over and around the apparatus discussed above in reference to FIG. 1. (As the terms are used herein, translucent materials are meant to include a subset of transparent materials.) For example, the translucent cover 190 includes a number of translucent plastic panels 192, which may also be transparent, that are fastened together along seams 194. The translucent cover 190 may be composed of a thermoplastic resin having suitable resistances to elevated temperatures and to the ultraviolet radiations in sunlight. The translucent cover 190 allows the inward passage of solar radiant energy while minimizing the outward transfer of heat by conduction and convection from the heat collecting dome 10.

Figure 17:
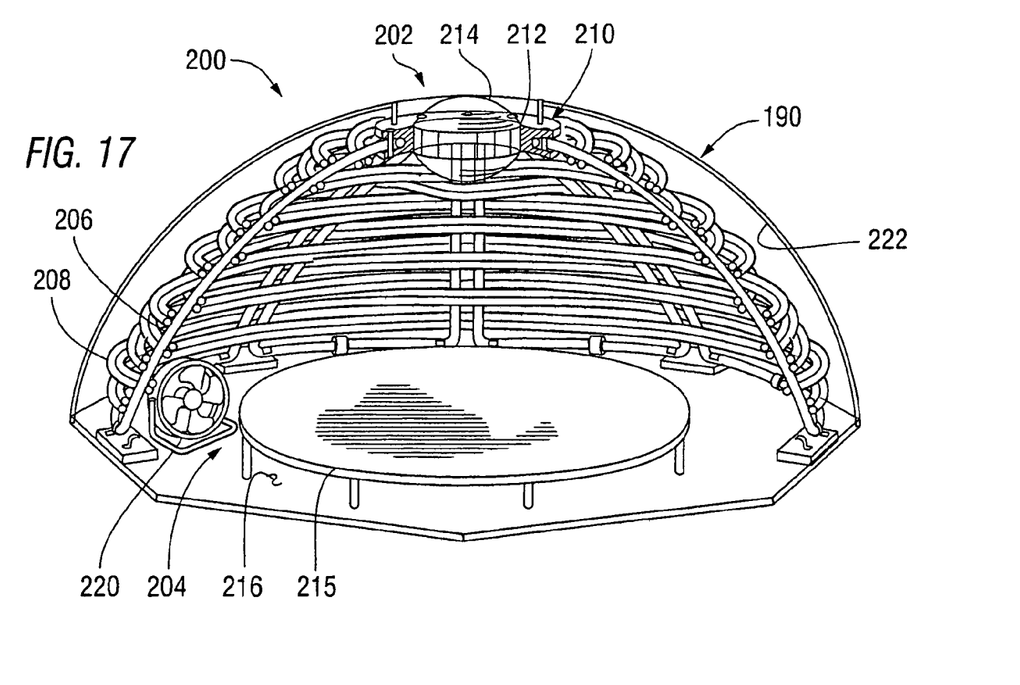
FIG. 17 is a fragmentary perspective view of a solar heat collecting dome built in accordance with a second embodiment of the invention.

FIG. 17 is a fragmentary perspective view of a solar heat collecting dome 200 built in accordance with a second embodiment of the invention, and shown with a front portion thereof removed to reveal internal details. The solar heat collecting dome 200 includes an opening 202 allowing the direct transmission of radiant solar energy into an internal space 204 within the frame 206 and transverse elements 208 of the dome 200. For example, in the dome 200, the upper disk 78, discussed above in reference to FIG. 9, is replaced with a ring 210 having a central opening 212, in which a lens 214 is held. The lens 214 concentrates solar radiant energy on a dish-shaped absorber 215 located, for example at the focal plane of the lens, above the floor surface 216. The dish-shaped absorber 215 absorbs energy that heats the air within the internal space 204, and additionally reflects a portion of the solar radiant energy to heat the frame 200 and transverse elements 208. An electrically-driven fan 220 is preferably additionally provided to circulate air within the internal space 204. Preferably, the dish-shaped absorber 215 is spaced away from the floor structure 216, so that the fan 220 can circulate air both above and under the absorber 215.

As shown in FIG. 17, the translucent cover 190 is held apart from the frame 206 and transverse elements 208 by ribs 222, minimizing conductive losses of heat from the frame 206 and transverse elements 208. This arrangement may also be used in the solar heat collecting dome 10, described above in reference to FIGS. 1-16.

The dish-shaped absorber 215 may be covered with thermally absorbing and reradiating materials, such as rusty steel plates, with the floor The dish-shaped absorber 215 may be covered with thermally absorbing and reradiating materials, such as rusty steel plates, with the floor surface 216 additionally being underlayed with an insulation material, such as glass wool to prevent a loss of heat. Experiments have shown that a temperature within the internal space 204 of 85° C. (185° F.) can be achieved with an ambient temperature of 34° C. (93° F.) using such insulation in the solar heat collecting dome 200.

Figures 18, 19, 20:
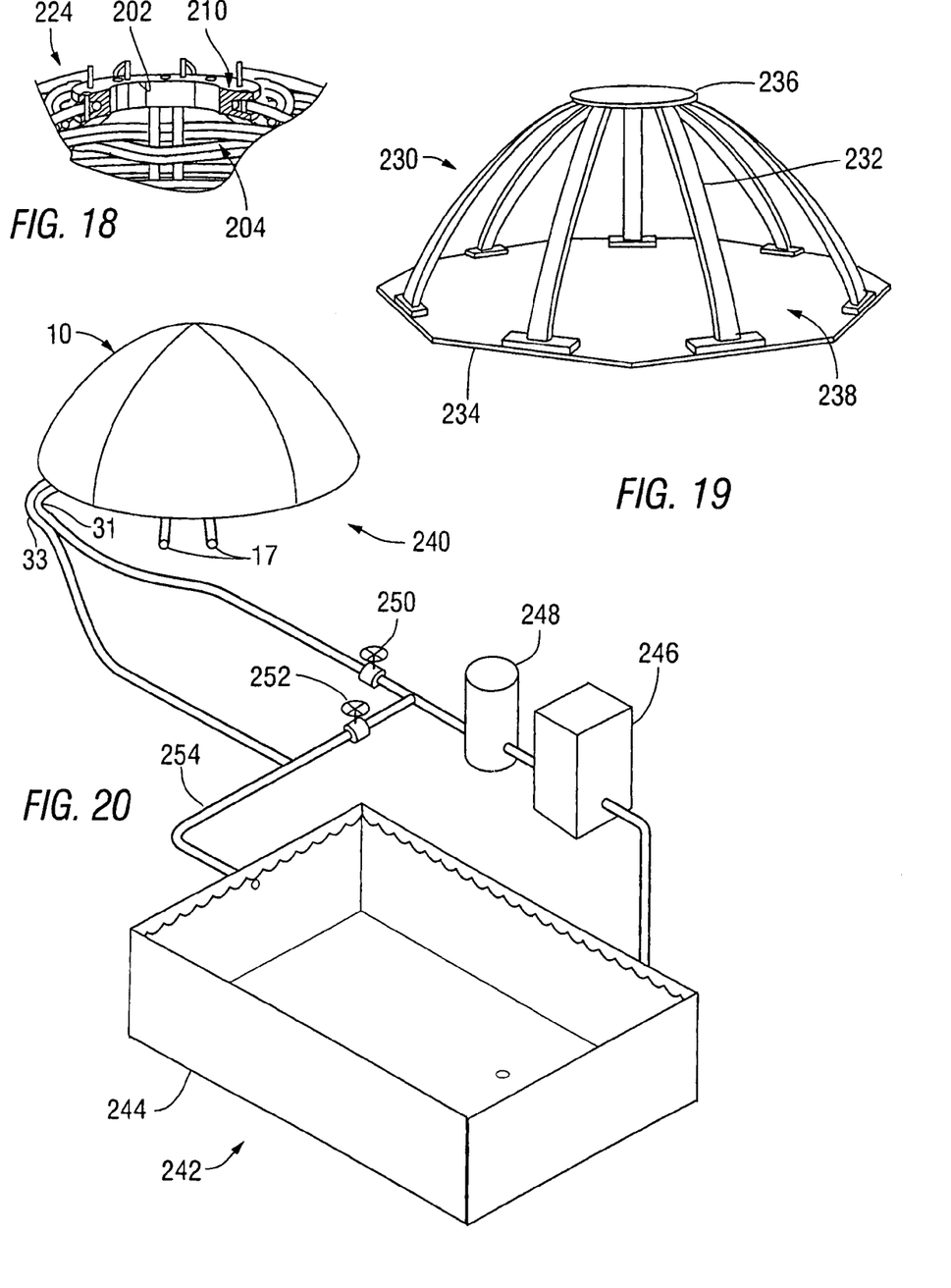
FIG. 18 is a fragmentary perspective view of an alternative version of the solar heat collecting dome of FIG. 17.
FIG. 19 is a perspective view of a third version of a frame, for use with the dome shaped helical structure of FIG. 3.
FIG. 20 is a schematic view of a single-fluid solar heating system including the heat collecting dome of FIG. 1.

FIG. 18 is a fragmentary perspective view of an alternative version of a solar heat collecting dome 224, which includes the opening 202 within the ring 206 without the lens 210 described above in reference to FIG. 17, so that solar energy is admitted into the internal space 204 without being concentrated by a lens. Other features of the dome 224 are as described above in reference to FIG. 17.

The previous discussion has described various versions of two-fluid systems, with a first fluid flowing within the first and second fluid paths 31, 33, within the dome shaped helical structure 26, and with a second fluid flowing within the frame fluid path 17, 176. Such systems have a number of advantages arising from the structure formed as the dome shaped dome shaped helical structure 26 is woven to extend around opposite sides of frame elements 12, 182. The flow of fluids in opposite directions in both the dome shaped helical structure 26 and in the frame elements 12, 182 encourages heat transfer within these structures, reducing a chance that hot spots may occur at various locations within the structure. Heat transfer also occurs readily between the fluid paths 31, 33 within the dome shaped helical structure 26 and the fluid path 17, 176 within the frame elements 12, 182, at all of the points where the dome shaped helical structure 26 crosses the frame elements 12, 182. Fluids flowing within the frame 11, 160 and the dome shaped helical structure 26 can thus be used for different purposes, with heat being transferred between the frame 11, 160 and the dome shaped helical structure 26 as heat is used more in one of the fluid paths than in the other.

Nevertheless, solar heat collection apparatus may be built in accordance with another version of the invention to include only a single-fluid system, with fluid flowing only within the dome shaped helical structure 26. Such apparatus may be built as described above, with the frame fluid path 17, 176 being unused. For example, the frame fluid path 17, 176 may be left empty and capped to prevent corrosion. Alternately, if it is desirable to increase the thermal capacity of the frame 11, 160 to reduce fluctuations in the temperature of a fluid flowing within the dome shaped helical structure 26, the frame fluid path 17, 176 may be filled, for example with water that is not circulated, with the water being left in place to absorb and release heat from a fluid circulating in the dome shaped helical structure 26.

Alternately, solar heat collection apparatus having fluid flowing only within the dome shaped helical structure 26 of FIG. 3 may be constructed using a second alternative frame 230, shown in FIG. 19, to include a number of frame elements 232 not including a fluid path. Each of the frame elements 232 extends upward and inward between a floor structure 234 and an upper disk 236, with an odd number of frame elements 232 extending in a circular pattern 238. Before the frame elements 232 are attached to the floor structure 234, the frame elements 232, attached to the upper disk 236, are held in an inverted orientation, with the dome shaped helical structure 26 being wound onto the frame elements 232, generally as described above in reference to FIG. 10. In the frame 230, the upper plate 236 may be replaced with a ring including an opening 238, for use as described above regarding FIGS. 18 and 19.

FIG. 20 is a schematic view of a single-fluid solar heating system 240, in which the first fluid path 31 and second fluid path 33 of a dome shaped helical structure 26 (shown in FIG. 3) within a heat collecting dome 10 are connected to a heat receiving structure 242. The heat receiving structure 242 includes a swimming pool 244 and conventional associated elements, such as a pump 246 and a filter 248. Water from the filter 248 is recirculated to the pool 244, either through the solar heating system 240, with a first valve 250 open while a second valve 252 is held shut, or through a bypass line 254, with the first valve 250 held shut, while the second valve 254 is open. Since this is a single-fluid system, no connection is made to the frame fluid path 17. While the heat collecting dome 10 of FIG. 1 is shown in the example of FIG. 20, it is understood that heat collecting apparatus built using the alternative frame 160 of FIG. 14 or the second alternative frame 230, of FIG. 19, or heat collecting apparatus built in accordance with the second embodiment of the invention, as discussed in reference to FIGS. 17 and 18, could be used as well.

Figure 21:
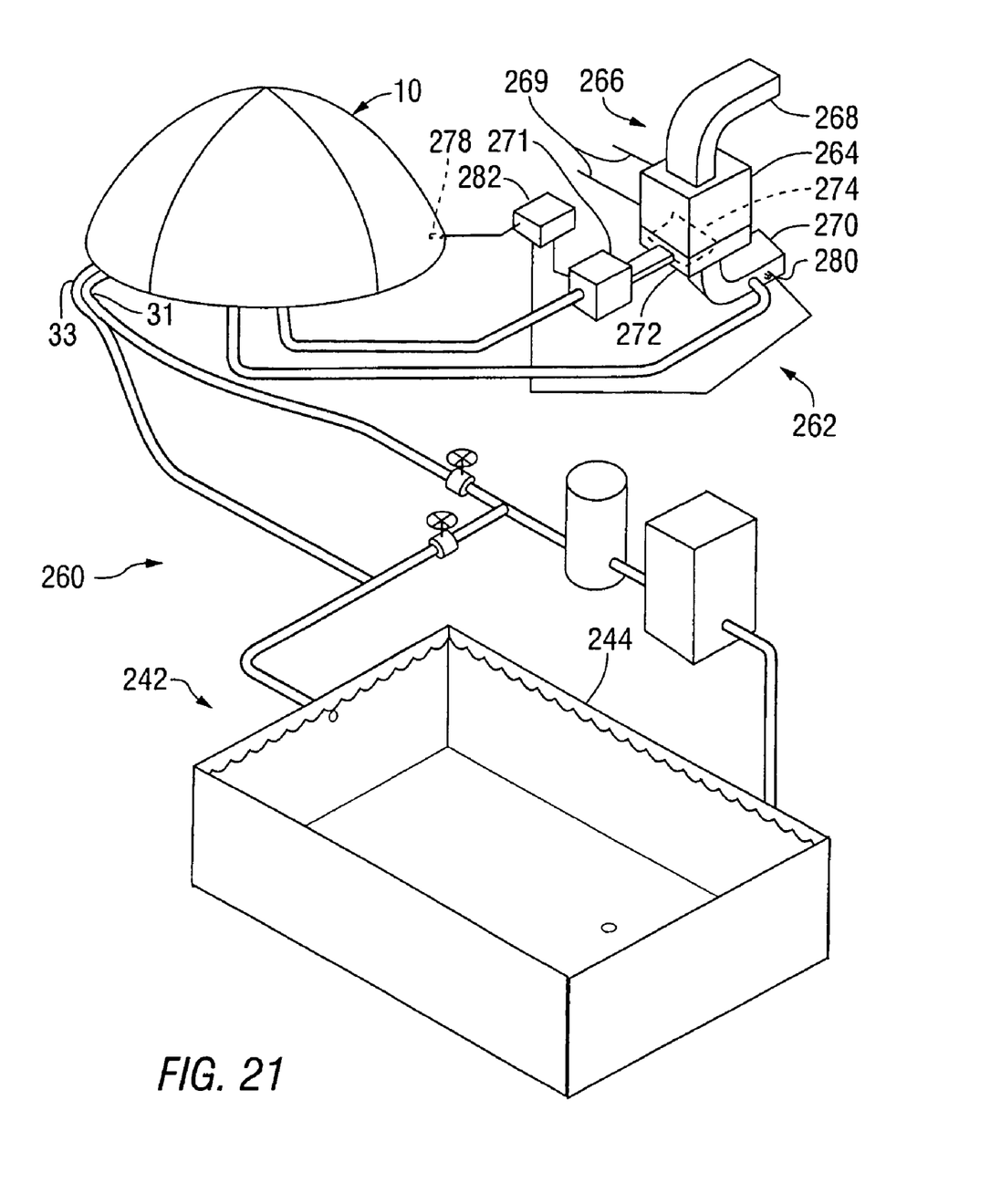
FIG. 21 is a schematic view of a first dual-fluid solar heating system including the heat collecting dome of FIG. 1.

FIG. 21 is a schematic view of a first dual-fluid solar heating system 260, in which the first fluid path 31 and the second fluid path 33 within a heat collecting dome 10 are connected to a first heat receiving structure 242 including a swimming pool 244, operating as described above in reference to FIG. 20. Additionally, the frame fluid path 17 within the heat collecting dome 10 is connected to a second heat receiving structure 262 including an air handling unit 264 of and air conditioning system 266 within a structure (not shown). The air conditioning system 266 includes a supply duct 268 supplying heated air from the air handling unit 264 within the structure and a return duct 270 returning air from within the structure to the air handling unit 264. A conventional heating system is provided for warming air moving through the air conditioning system 266, using, for example, a refrigerant moving through a line 269 including coils (not shown) within the air handling unit 264, with the refrigerant being heated by a reverse-cycle air conditioning compressor.

In the solar heating system 260, air is circulated within the frame fluid path 17, being moved by a fan unit 271 into a plenum 272 additionally receiving air from the return duct. For example, a curved plate 274 within the plenum 272 deflects air from the fan unit into the air handling unit 264. Preferably, the system 260 additionally includes a first thermal sensor 278, sensing a temperature within the frame fluid path 17, and a thermal sensor 280, sensing a temperature within the return duct 270. Output signals from these sensors 278, 280 are provided as inputs to a controller 282, which then, for example, operates the fan 271 so that air is moved into the plenum 272 only when it can heat the air being delivered through the return duct 270.

Figure 22:
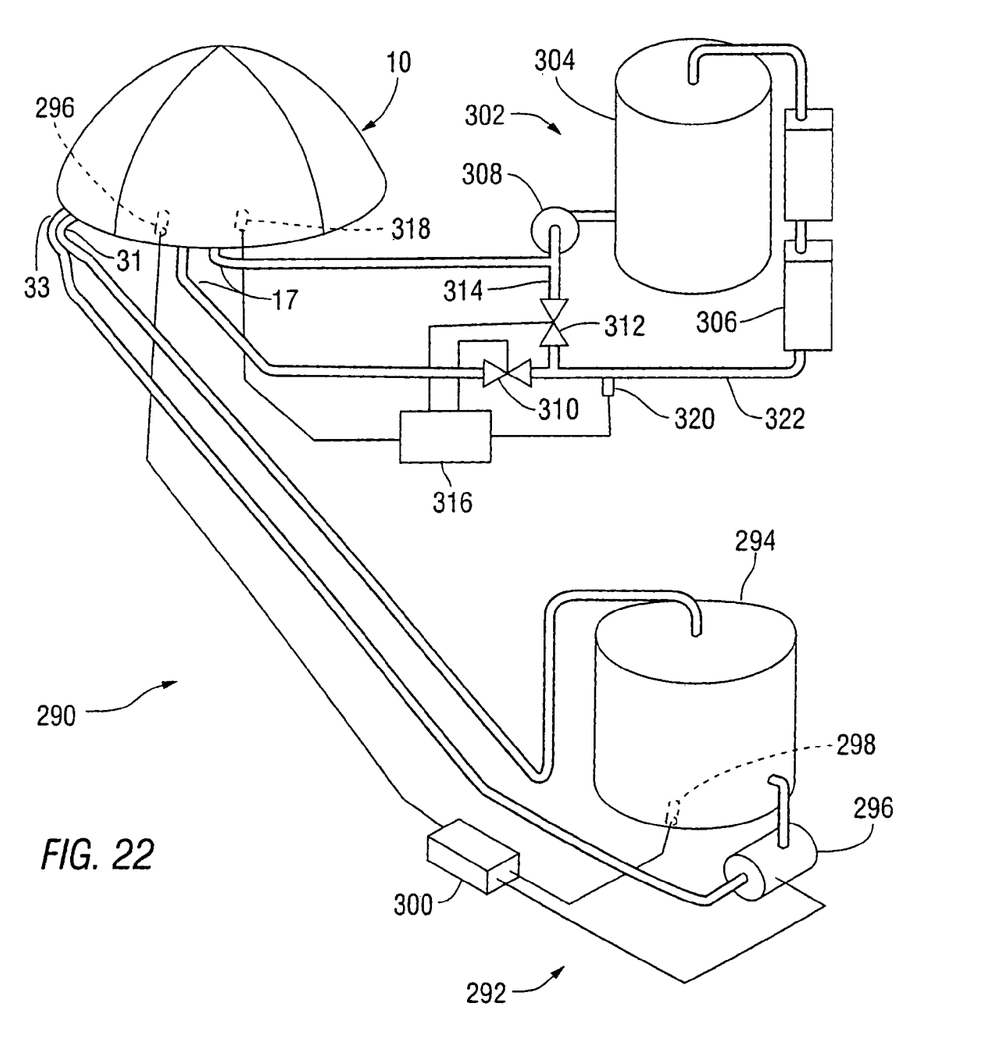
FIG. 22 is a schematic view of a second dual-fluid solar heating system including the heat collecting dome of FIG. 1.

FIG. 22 is a schematic view of a second dual-fluid solar heating system 290, showing the first fluid path 31 and the second fluid path 33 of the heat collecting dome 10 connected to a first heat receiving structure 292 including a hot water storage reservoir 294 and a recirculation pump 296. For example, water within the storage reservoir 294 may be used for conventional purposes, such as dish washing and showering within a residence. Preferably, the solar heating system 290 additionally includes a first thermal sensor 296, sensing the temperature of the second fluid path 31 and a second thermal sensor 298, sensing a temperature within the hot water storage reservoir 294. Output signals from these sensors 296, 298 are provided as inputs to a first controller 300, which causes the recirculation pump 296 to operate when fluid from the heat collecting dome 10 is needed and can be used to increase the temperature of water within the storage reservoir 294.

In the solar heating system 290, the frame fluid path 17 within the heat collecting dome 10 is connected to a second heat receiving structure 302 in the form of a hot water system for heating a structure (not shown), including a hot water reservoir 304, in which water is heated by conventional means, such as electrical power or the combustion of oil or gas, and a number of heat exchangers 306 through which hot water is circulated to heat various spaces within the structure. A recirculation pump 308 is used to keep water circulating through the heat exchangers 306 and into the reservoir 304, either through the frame fluid path 17 with a first valve 310 open and a second valve 312 closed, or through a by-pass line 314 with the first valve 310 closed and the second valve 314 open. For example, a controller 316 controls operation of the valves 310, 312, in response to output signals from a thermal sensor 318 sensing a temperature within the frame fluid path 17 and a thermal sensor 320 sensing a temperature within a fluid path 322 returning water from the heat exchangers 306.

Figure 23:
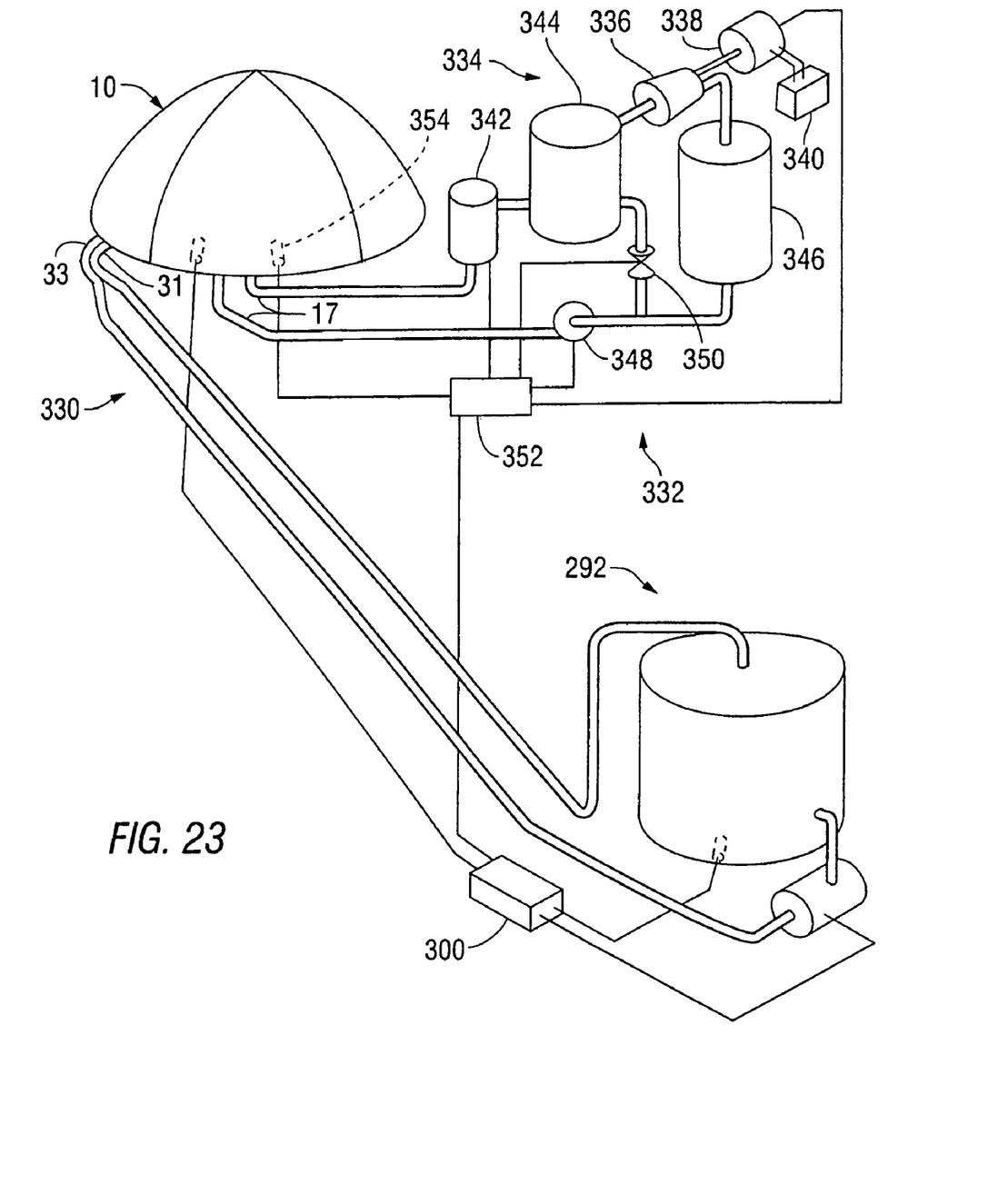
FIG. 23 is a schematic view of a third dual-fluid solar heating system including the heat collecting dome of FIG. 1.
Figure 24:
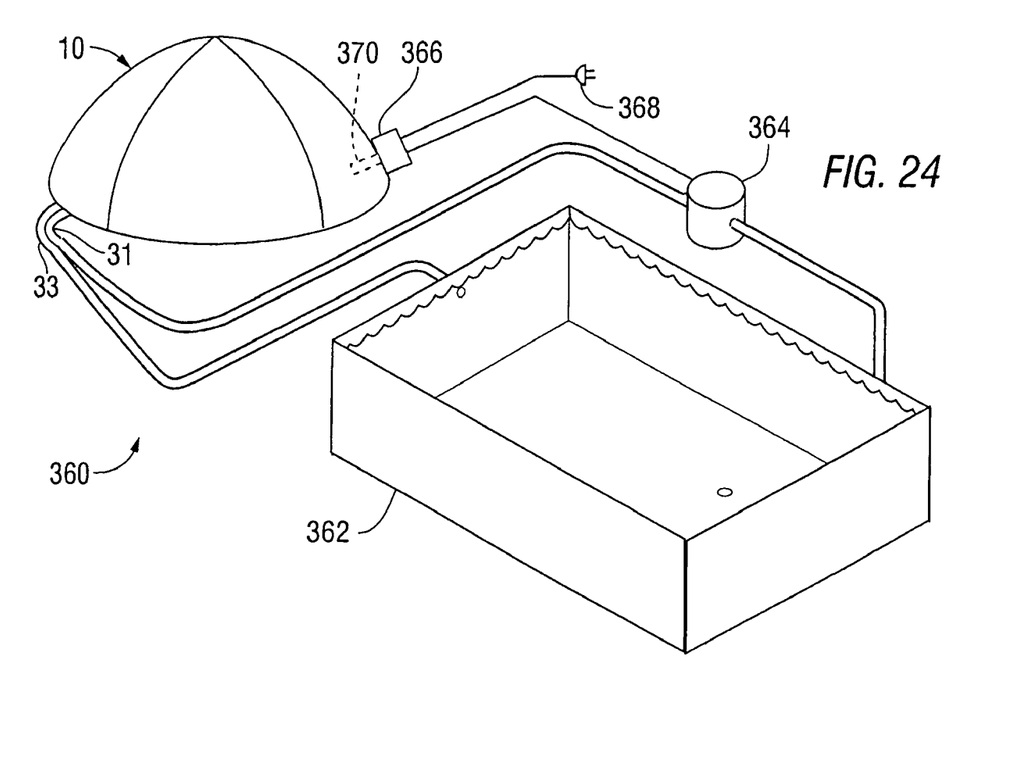
FIG. 24 is a schematic view of a single-fluid solar heating system made from a kit for heating a pool or spa.

FIG. 23 is a schematic view of a third dual-fluid solar heating system 330, showing the first fluid path 31 and the second fluid path 33 of the heat collecting dome 10 connected to the first heat receiving structure 292, operating as discussed above in reference to FIG. 22. Additionally, the frame fluid path 17 is connected to a second heat receiving structure 332 including an electrical power generating system 334, including a turbine 336 driving an alternator 338 to power an electrical load 340. For example, the solar heating system 330 includes a vacuum pump 342, which is operated to lower the temperature at which a liquid, such as water turns to a vapor, such as steam, providing for operation of a steam-driven system at temperatures that can be achieved within the solar heating dome 10. Steam released from the vacuum pump 342 is supplied to a vapor expansion tank 344, which supplies steam to the turbine 336. Steam from the turbine 336 is supplied as an input to a vapor condenser 346, in which the steam is cooled with air blown through a cooling fan (not shown) to return the steam to a water state. The water is then pumped back into the heat collecting dome 10 through a recirculating pump 348. Fluid from the vapor expansion tank 344 may be also recirculated into the heat collecting dome 10 with a flow control valve 350 being held open. A system controller 352 controls operation of the vacuum pump 342 and the flow control valve 350, receiving input signals from the alternator 338 and from a thermal sensor 354, which provides an indication of the temperature within the frame fluid path 17. Preferably, the system controller is additionally connected to the controller 300 within the first 10, a recirculation pump 364, and a switching unit 366. The switching unit 366, which is connected to line voltage, for example, through a plug 368, additionally includes a thermal sensor 370, which senses a temperature within the heat collecting dome 10. The switching circuit 366 switches the recirculating pump 364 on and off in response to an output from the thermal sensor 366, so that the recirculating pump 364 recirculates water from the pool through the first fluid path 31 and a second fluid path 33 of the heat collecting dome 10.

While the heat collecting dome 10 of FIG. 1 is shown in the examples of FIGS. 21-24, it is understood that heat collecting apparatus built using the alternative frame 160 of FIG. 14, or heat collecting apparatus built in accordance with the second embodiment of the invention, as discussed in reference to FIGS. 17 and 18, could be used as well.

Figure 25:
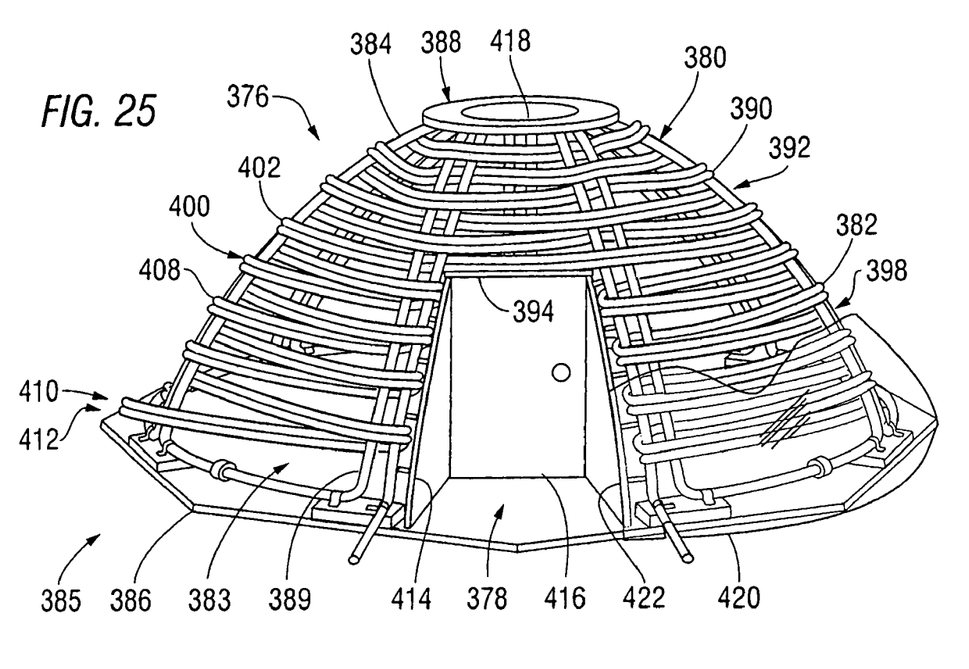
FIG. 25 is a fragmentary perspective view of a solar heat collecting dome including an opening for a doorway.

FIG. 25 is a fragmentary perspective view of a solar heat collecting dome 376 built in accordance with a third embodiment of the invention to include an opening for a doorway 378 within the frame 380 and within various of the transverse elements 382, through which individuals can enter the space 383 within the dome 376. For example, the frame 380, like the frame 11, described above in reference to FIG. 6, includes a number of frame elements 384 arranged in a circular pattern 385 to extend upward and inward from a floor structure 386 to an upper disk 388. Two of the frame elements 384 are formed as doorway frame elements 389, being disposed at opposite sides of the doorway 378.

The solar heat collecting dome 376 includes a first plurality of transverse elements 390 within an upper portion 392 of the dome 376, extending upward from the top 394 of the doorway, and a second plurality of transverse elements 382 extending around the dome 376 from opposite sides of the doorway 378 in a lower portion 398 of the dome 376. Preferably, both the first plurality of transverse elements 390 and the second plurality of transverse elements 382 are formed as portions of a single flexible structure 400, which is elements 382 extending around the dome 376 from opposite sides of the doorway 378 in a lower portion 398 of the dome 376. Preferably, both the first plurality of transverse elements 390 and the second plurality of transverse elements 382 are formed as portions of a single flexible structure 400, which is formed as described above in reference to FIG. 3, or alternately as described above in reference to FIGS. 4-7. Within the upper portion of the dome 376, the single flexible structure 400 is interwoven with the frame elements 382, as described above in reference to FIG. 2, to form a helical spiral 402.

Figure 26:
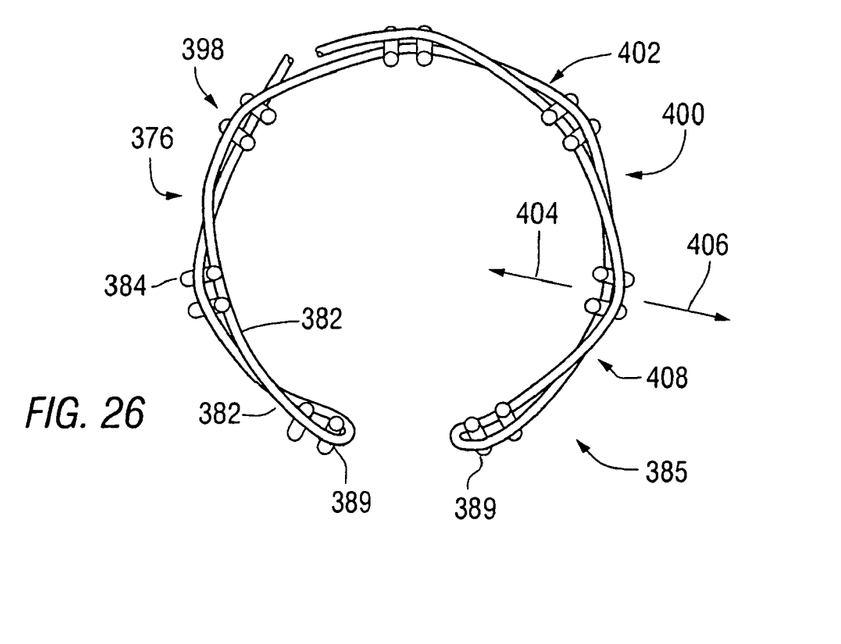
FIG. 26 is a fragmentary cross-sectional plan view of a lower portion of the solar heat collecting dome of FIG. 25.

FIG. 26 is a fragmentary cross-sectional plan view of a lower portion 398 of the solar heat collecting dome 376, showing sections of the frame elements 384 therein and additionally showing an adjacent pair of transverse elements 382, which extend around each of the doorway frame elements 389 and across opposite sides of each of the frame elements 384 between the doorway frame elements 389, around the solar heat collecting dome 376 in the circular pattern 385. In addition, adjacent frame elements 389 extend alternately inside, in the direction of arrow 404, or outside, in the direction of arrow 406, each of the frame elements 384 between frame elements 389 in the circular pattern 385. Adjacent transverse elements 382 are joined to one another to form a reversing spiral structure 408, which is attached to the dome-shaped helical spiral 402, forming the single flexible structure 400. The single flexible structure 400 includes a first fluid path 410 and a second fluid path 412, which are connected to one another as described above in reference to FIG. 3, or alternately as described above in reference to FIGS. 5-7.

The solar heat collecting dome 376 preferably includes a door frame assembly 414 attached to the doorway frame elements 389 and a door 416 hingedly attached to the door frame assembly 414. Preferably, the upper disk 388 includes an opening 418, through which solar radiation is admitted to the space 383 within the dome 376. A lens 214 may be held in the opening 418, in the manner described above in reference to FIG. 17. Preferably the dome 376 additionally includes a translucent cover 420, having an opening 422 for the doorway 378, but otherwise extending around and over the dome 376. For example, the space 378 within the dome 376 may be used as a solar heated sauna or as a place for growing plants needing a warmed environment.

While the invention has been shown and described in its preferred versions or embodiments with some degree of particularity, it is understood that this description as been given only by way of example, and that many changes may be made without departing from the spirit and scope of the invention, as defined by the appended claims.

What is claimed is:

1. Solar heat collecting apparatus comprising:
a frame including a plurality of frame elements, each extending upward and inward from a lower end attached to a floor structure to an upper end attached to an upper plate, wherein all of the frame elements comprise an odd number of frame elements arranged in a circular pattern;
a first plurality of transverse elements, extending across each of the frame elements and interwoven with the frame elements so that each transverse element extends across the frame elements alternately inside and outside the frame elements, and so that transverse elements adjacent one another cross each frame element on opposite sides of the frame element, wherein each of the transverse elements includes portions of a first fluid path and of a second fluid path, with fluid flowing in opposite directions within the first and second fluid paths, wherein each of the transverse elements extends completely around the circular pattern, wherein the transverse elements in the first plurality of transverse elements are connected to one another to form a dome shaped helical structure extending around and along the frame elements, and wherein the dome shaped helical structure includes a first end, having an inlet connected to the first fluid path and an outlet connected to the second fluid path, and a second end, in which the first fluid path is connected to the second fluid path;
a doorway;
a doorway frame element within the plurality of frame elements at each side of the doorway; and
a second plurality of transverse elements, extending around each of the doorway frame elements and interwoven with frame elements between the doorway frame elements so that each transverse element within the second plurality of transverse frame elements extends across the frame elements between the doorway frame elements in the circular pattern, alternately inside and outside the frame elements, and so that transverse elements adjacent one another cross each frame element between the doorway frame elements on opposite sides of the frame element, wherein transverse elements in the second plurality of transverse elements are joined to one another to form a reversing spiral structure connected to the dome shaped helical structure with a first path in the reversing spiral structure connected to the first path within the dome shaped helical structure, and with a second path within the reversing spiral structure connected to the second path within the dome shaped helical structure.

2. The solar heat collecting apparatus of claim 1, additionally comprising:
an inner space surrounded by the frame and the transverse elements; and
a fan circulating air within the inner space.

3. Solar heat collecting apparatus comprising:
a frame including a plurality of frame elements, each extending upward and inward from a lower end attached to a floor structure to an upper end attached to an upper plate, wherein
all of the frame elements comprise an odd number of frame elements arranged in a circular pattern,
the frame additionally includes an inlet, an outlet, and a frame fluid path extending between the inlet and the outlet,
the plurality of frame elements includes an inlet/outlet frame element and a plurality of intermediate frame elements,
a portion of the frame fluid path within a first tubular section within the inlet/outlet frame element is connected only to the inlet of the frame at the lower end of the inlet/outlet frame element,
a portion of the frame fluid path within a second tubular section within the inlet/outlet frame element is connected only to the outlet of the frame at the lower end of the inlet/outlet frame element,
portions of the frame fluid path within the tubular sections within each intermediate frame element are connected only to one another at the lower end of the frame element, and
portions of the frame fluid path within each of the tubular sections within each frame element are connected at the top of the frame element only to one of the tubular sections within an adjacent frame element;
a first plurality of transverse elements, extending across each of the frame elements and interwoven with the frame elements so that each transverse element extends across the frame elements alternately inside and outside the frame elements, and so that transverse elements adjacent one another cross each frame element on opposite sides of the frame element, wherein
each of the transverse elements includes portions of a first fluid path and of a second fluid path, with fluid flowing in opposite directions within the first and second fluid paths,
each of the transverse elements extends completely around the circular pattern,
the transverse elements in the first plurality of transverse elements are connected to one another to form a dome shaped helical structure extending around and along the frame elements, and
the dome shaped helical structure includes a first end, having an inlet connected to the first fluid path and an outlet connected to the second fluid path, and a second end, in which the first fluid path is connected to the second fluid path;
an inner space surrounded by the frame and the transverse elements;
an opening within the frame and the transverse elements allowing solar radiation into the inner space;

a disk shaped heat absorber extending below the inner space; and a lens concentrating solar radiation passing through the opening on the disk shaped heat absorber, wherein the disk shaped absorber is held at the focal plane of the lens.

4. The solar heat collecting apparatus of claim 3, additionally comprising a translucent cover extending around and above the frame and the transverse elements.

5. The solar heat collecting apparatus of claim 4, additionally comprising a plurality of ribs holding the translucent cover outward from the frame and transverse elements.

6. Solar heat collecting apparatus comprising:

a floor structure;

a frame including a number of frame elements, an inlet, an outlet, and a frame fluid path extending between the inlet and the outlet, wherein the frame elements are arranged in a circular pattern, each of the frame elements extends upward and inward from a lower end, attached to the floor structure, to an upper end, each of the frame elements includes a pair of tubular sections forming portions of the frame fluid path, with a fluid flowing in opposite directions within the air of tubular elements, the tubular sections include a first tubular section including a portion of the frame fluid path attached to the inlet, a second tubular section including a portion of the frame fluid path attached to the outlet, and a plurality of intermediate tubular sections arranged in the circular pattern between the first and second tubular sections, a portion of the frame fluid path included within each of the intermediate tubular sections is connected only to portions of the frame fluid path within tubular sections adjacent each side of the intermediate tubular section, being connected to the portion of the frame fluid path within the tubular section at one side at the upper end of the frame element and to the portion of the frame fluid path within the tubular section at another side at the lower end of the frame element, portions of the frame fluid path within the intermediate tubular sections within a frame element are connected to one another at the lower end of the frame element, and portions of the frame fluid path within each of the intermediate tubular sections within a frame element are connected at the top of the frame element only to the tubular sections within adjacent frame elements;

a dome shaped helical structure, including a fluid path separate from the frame fluid path, extending around and alone the frame elements;

an inner space surrounded by the frame and the dome shaped helical structure;

an opening within the frame and the transverse elements allowing solar radiation into the inner space;

a disk shaped heat absorber extending below the inner space; and a lens concentrating solar radiation passing through the opening on the disk shaped heat absorber, wherein the disk shaped absorber is held at the focal plane of the lens.

7. The solar heat collecting apparatus of claim 6, additionally comprising a translucent cover extending around and above the frame and the dome shaped helical structure.

8. The solar heat collecting apparatus of claim 7, additionally comprising a plurality of ribs holding the translucent cover outward from the frame and the dome shaped helical structure.

9. The solar heat collecting apparatus of claim 3, additionally comprising:

an inner space surrounded by the frame and the transverse elements; and a fan circulating air within the inner space.

* * * * *